May 23, 1933. S. B. APPLEBAUM 1,910,979
TREATING BOILER FEED WATER
Filed March 14, 1931
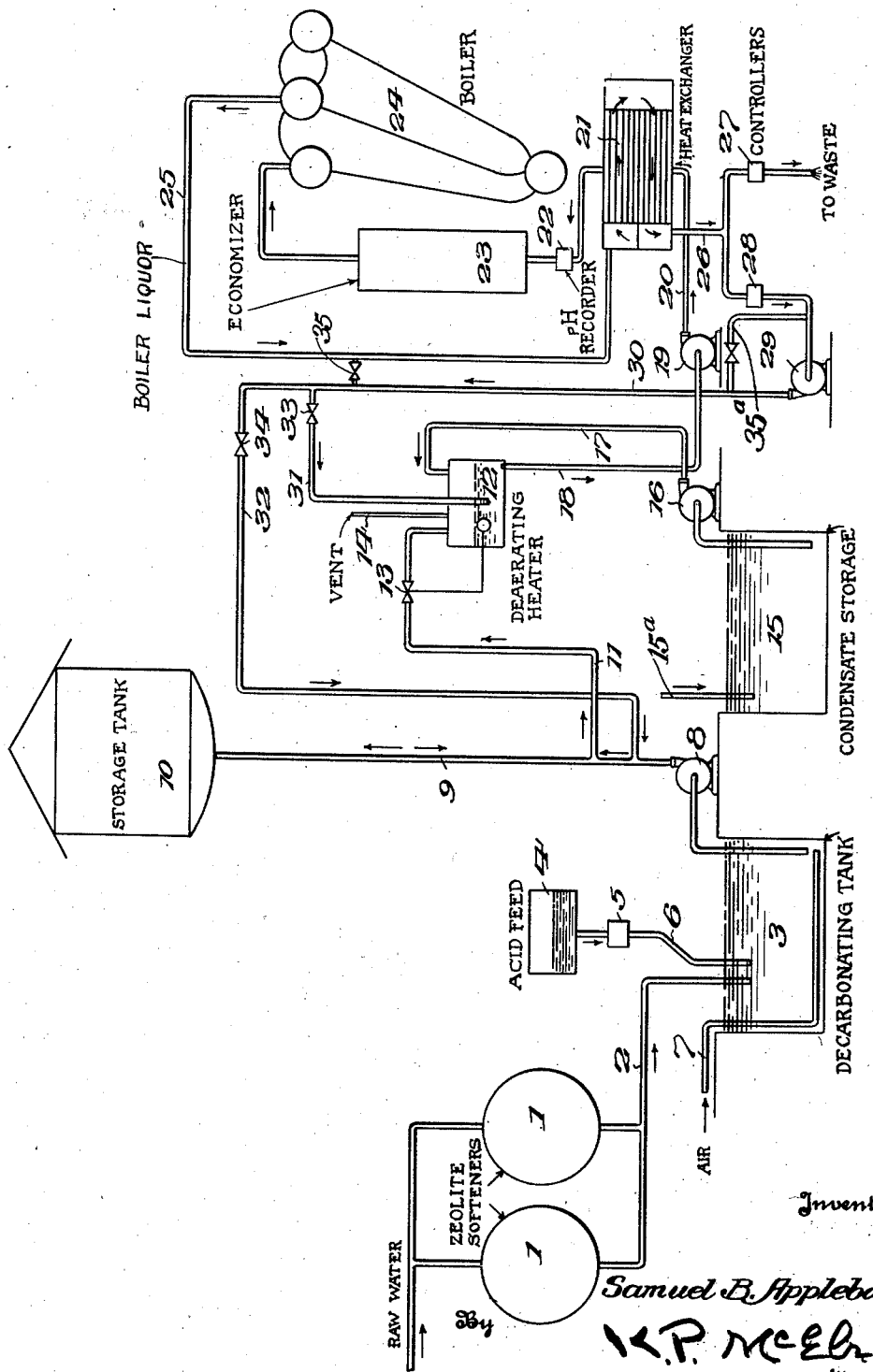

Patented May 23, 1933

1,910,979

UNITED STATES PATENT OFFICE

SAMUEL B. APPLEBAUM, OF NEW ROCHELLE, NEW YORK, ASSIGNOR TO THE PERMUTIT COMPANY, OF NEW YORK, N. Y., A CORPORATION OF DELAWARE

TREATING BOILER FEED WATER

Application filed March 14, 1931. Serial No. 522,769.

This invention relates to treating boiler feed water; and it comprises an improved method of preparing a non-corrosive boiler feed water wherein a boiler feed water composed of or containing artificially softened or naturally soft water containing alkali carbonate or bicarbonate is treated with sulfuric acid or acid sulfates or acid sulfites to convert into sulfate a part of the alkali carbonate or bicarbonate of the softened water and the feed water after the sulfating treatment and, before any extensive contact with metal parts, is treated with concentrated alkaline liquor from the boiler in a relative amount sufficient to convert the greater part of the sodium bircarbonate and free $CO_2$ contained in the sulfate treated water into normal sodium carbonate, a pH value around 9 or above being thereby maintained in the boiler feed; and it also comprises certain organizations of apparatus elements useful in said method; all as more fully hereinafter set forth and as claimed.

In steam boiler plants utilizing modern methods promoting efficiency and economy, treatment of the feed water is becoming increasingly important not only from the standpoint of boiler efficiency but from that of wear and tear and maintenance of costly appurtenances. It is common practice to remove scale forming constituents from the water used by softening it and this keeps the feed water system, including the feed water piping, economizers, etc., as well as the boilers, free from scale, sludge or other deposit, so that they operate at full efficiency in the transfer of heat and overheating and burnouts of the metal parts which would result from the deposits are avoided. However, keeping the metal surfaces clean causes these surfaces to be exposed to the water and removes any protective coating which these deposits may previously have formed. Thus the scale prevention treatment introduces new corrosion problems and it becomes necessary to further improve the water in order to obviate corrosion risks. This is true whether the boiler feed is composed entirely of softened raw water, or whether, as in the case of power plants that operate with condensing engines or turbines, the boiler feed is mainly composed of condensate and is made up by a minor addition of softened water. Both the condensate and the softened make-up water keep the metal surfaces clean and render them subject to corrosion if the water is corrosive. An expedient of general utility is returning some portion of the concentrated boiler liquid for admixture with the feed water prior to any extensive contact with corrodible metal parts (Kriegsheim Patent No. 1,235,815).

In general, the two important factors in corrosion are the oxygen content and the pH value of the water. For pH values from 6 to about 9, the oxygen is the main factor and the degree of corrosion increases with the oxygen content. With pH values below 6, corrosion will take place even in the absence of oxygen, due to the acidity of the water and with much oxygen present the combined action may have serious consequences. On the other hand, as the pH value rises above 6 to the neighborhood of 9 and above, corrosion is inhibited, even in the presence of slight amounts of oxygen. The feed water system, including the feed water piping and economizer, is much more liable to corrosion than the boiler proper. The boiler saline liquor, i. e., the concentrated liquor inside the boiler, has a much higher pH value than the feed water itself. This is not only due to the fact that the liquor is more concentrated and therefore the pH value is higher on account of this concentration, but it is also because when sodium bicarbonate, present in the feed water, is converted into sodium carbonate and sodium hydroxid in the boiler by hydrolysis and loss of $CO_2$ as gas, the equivalent amounts of sodium carbonate and sodium hydroxid give a higher pH value than that due to the sodium bicarbonate from which they were formed. For example, the pH value of a pure solution of sodium bicarbonate in the absence of free $CO_2$ is about 8.3. On the other hand, a small concentration of sodium carbonate dissolved in distilled water gives a pH value of about 9 and as the amount of sodium carbonate increases to about 100 ppm., the pH value increases to about 11. In the case of sodium hydroxid, 0.5 ppm. in distilled water gives a theoretical pH value of about 9 and as the amount of sodium hydroxid increases to 100 ppm., this value increases to about 11.3.

A form of water softening which is in common practice today is the zeolite system. This system of water softening operates by base exchange, that is, the calcium and magnesium bicarbonates, carbonates, chlorides and sulfates are converted into sodium bicarbonates, carbonates, chlorides and sulfates in equivalent amount. If the composition of the raw water is such that the ratio of sulfate to bicarbonate and carbonate is low, the zeolite softened water will contain the same low ratio. The practice has developed of late of demanding that the ratio of sodium sulfate to sodium carbonate in the boiler salines be maintained above certain limits, depending on the boiler pressure. For example, sulfate-carbonate ratios proportioned with boiler pressures as follows have been recommended:

| Boiler pressure pounds per square inch | Ratio $\frac{Na_2SO_4}{Na_2CO_3}$ |
| --- | --- |
| 150 and under | 1:1. |
| 150 to 250 | 2:1. |
| Over 250 | 3:1. |

To obtain these sulfate-carbonate ratios, in many instances, addition of sulfuric acid or acid sulfates or sulfites to the zeolite softened water is required. As stated above, the softening of water results in maintaining the metal surfaces of the feed water system and boilers in a clean condition and thus exposes them to corrosion if the water is corrosive. This new practice of demanding high sulfate-carbonate ratios has further increased the possibility of corrosion by reducing the pH value of the final feed water. The reactions involved are as follows: The sulfating reagent reacts with the sodium bicarbonate in the soft water, forming sodium sulfate and free $CO_2$. Not all the sodium bicarbonate is destroyed by this acid addition; and the sulfating treatment is conducted so that a portion of the original sodium bicarbonate is left with no normal carbonate. The free $CO_2$ formed by the reaction can be and advantageously is, largely removed from the water by aerating the water and this aeration reduces the free $CO_2$ content down to about 5 or 10 ppm. The pH value of the resulting aerated water depends upon the ratio of the residual sodium bicarbonate to free $CO_2$. When this ratio is 5:1 the pH value of the water is about 7 and when this ratio is 1:1, the pH value is about 6.3. The closer the pH value approaches 6, the greater is the danger of the increasing corroding effects due to the acidity of the water and to oxygen introduced in aeration. Since the desired ratio of sodium sulfate to sodium carbonate is fixed by the boiler pressure and is independent of the composition of the original water before acid is added, many cases arise where the pH value after aeration must be very close to 6 in order to obtain the desired sulfate-carbonate ratio. This, combined with the possibility of overfeeding of acid at times and also the possibility at times of incomplete removal of oxygen in deaerating heaters, has caused new corrosion problems since this practice of increasing the sulfate-carbonate ratio has arisen.

Not only does the use of sulfuric acid, acid sulfate, etc. for increasing the sulfate-carbonate ratio raise new corrosion problems, but when a certain sulfate-carbonate ratio is desired in the feed water, raising the pH value by the addition of alkali is precluded. If alkali were added to the feed water stream for that purpose, the sulfate-carbonate ratio would again be decreased below the desired limits and the purpose of the previous addition of acid would be defeated. It is therefore necessary, in using an alkali to raise the pH value, to accompany it by sufficient sodium sulfate so that the sulfate-carbonate ratio of the resulting mixture is not decreased.

In the present invention, this result is accomplished by recirculating boiler blowoff or saline liquor back into the feed water stream to raise the pH value of the boiler feed stream after the acid treatment, having regard to the relative quantities of sodium bicarbonate and free $CO_2$ in the feed water and of sodium carbonate and sodium hydrate in the saline liquor, and also to the sulfate-carbonate ratio.

I have discovered that a return to the feed water, after the sulfating treatment, of boiler blowoff liquor in amounts resulting in conversion to normal carbonate of all the free $CO_2$ and of enough of the bicarbonate to raise the pH value to 9 substantially prevents corrosion of the boiler accessories and serves to extend their operative life in a most substantial degree. Such boiler liquor return maintains whatever ratio of sulfate may be desired in the boiler liquor itself. Concomitantly, it has been found that corrosion inside the boiler is also practically absent when the amount of boiler liquor return is controlled with relation to the pH value of the boiler feed. Any desired sulfate-carbonate ratio is automatically maintained. The sulfating of the make-up water is effected by treatment either with sulfuric acid, aluminum or iron sulfate, acid sulfate, or with acid sulfite or the like. Sulfurous acid has also been proposed (Kriegsheim Patent No. 1,762,784).

In practice it has been found ordinarily sufficient to recirculate boiler liquor in amounts such that enough of the original sodium bicarbonate is converted into sodium carbonate to raise the pH value to about 9. Raising the pH value above 9 by addition of boiler liquor to the feed water does no harm and in some cases it may be advisable to add enough boiler liquor to convert all bicarbonate as well as free $CO_2$ to normal carbonate or even to reach a pH value of 10 or more in the boiler feed or a point where slight amounts of caustic soda are present in the feed water. Ordinarily, however, as stated, a pH of 9 suffices and the feed water then contains very little bicarbonate, that is, nearly all of the soda is then present as the normal carbonate. In condensing plants, where as a rule only small fractions of the feed water are made up by softened water, the pH value of the softened and sulfated make-up water may be raised sufficiently by the boiler liquor return to insure that the made up feed water shall have a pH value of about 9 or above, all free $CO_2$ in the condensate thereby being completely neutralized. In such a case a return of boiler liquor may be made, if desired, to the made up boiler feed. When the boiler feed has a pH from 9 to 11, corrosion is under control.

The addition of boiler liquor to the make-up water is advantageously made in a deaerating heater where bicarbonate $CO_2$ as well as residual free $CO_2$ is expelled from the water by heat. In this method the pH of the make-up water is adjusted to the desired value partly by heating, partly in neutralizing bicarbonate by caustic soda originating in the boiler and partly by addition of normal carbonate supplied by the boiler liquor, the final adjustment being made by the amount of boiler liquor returned.

In the accompanying drawing, I have shown diagrammatically in the form of a flow sheet an apparatus assemblage useful in operation of the process of my invention.

Referring to the drawing, 1, 1 represent two zeolite softeners through which the raw make-up water passes to be softened, the two being alternately used. From the softeners, the water runs through pipe 2 into the sulfating and decarbonating tank 3, where the sulfating agent, which may be dilute sulfuric acid or another suitable reagent, is added from an acid feed tank 4 through a proportioning device 5 and acid feed pipe 6. In the tank 3 air is bubbled through the water by means of air pipe 7 for the purpose of removing free $CO_2$ generated by the sulfating treatment. The sulfated and decarbonated softened water is moved by means of pump 8 and pipe 9 to storage tank 10. From pipe 9 leads pipe 11 conveying the water either from tank 10 or directly from the pump 8 discharge into deaerating heater 12, fed through float controlled valve 13, and usually heated by exhaust steam. Deaerator 12 is provided with vent 14. When a plant utilizes returned condensate water for boiler feet it may be introduced directly into heater 12, or it may be stored in tank 15 and introduced into 12 by means of pump 16 and pipe 17. A delivery conduit for condensate water coming to storage tank 15 is shown at 15a. If desired, the condensate storage tank may be located above the elevation of the elevated storage tank 10 so that a gravity flow to heater 12 may be possible, thus dispensing with pump 16. Heated water leaves heater 12 through pipe 18 and is pumped by boiler feed pump 19 through discharge feed pipe 20, heat exchanger 21, pH recorder 22 and economizer 23 into boiler 24. Other and closed heaters may be placed in the discharge feed water line to put heat into the feed water before it enters the boiler. From the boiler a continuous blowoff stream of alkaline boiler saline liquor passes out through pipe 25 into the exchanger 21 where it exchanges heat with the feed water that passes through the heat exchanger in a flow countercurrent to that of the boiler liquor. From 21 the blowoff liquor passes through pipe 26 into two flow rate controllers 27 and 28. Controller 27 controls the rate of flow of the blowoff water passing to waste which is required to hold the concentration of boiler salines below the limit necessary to prevent foaming or priming and to insure the production of dry steam. Controller 28 controls the rate of flow of the boiler saline liquor recirculating into the feed water. This rate of flow is coordinated with the pH value of the feed water as shown by recorder 22, the flow being adjusted by means of controller 28 to maintain the desired pH value in the feed water. The recirculating boiler liquor, after passing through controller 28 is pumped by recirculating pump 29 which discharges the liquor through pipe 30. Pipe 30 may have two branches 31 and 32 provided respectively with valves 33 and 34 adapted to pass the return liquor either through pipe 31 or 32 or partly through each. Branch 31 is adapted to return the recirculating boiler liquor into the water space of the heater 12, while branch 32 is adapted to conduct the liquor into the decarbonated water at the discharge of pump 8. Introduction of return liquor through branch 32 into the discharge of pump 8 neutralizes free $CO_2$ left in the water after its decarbonation in tank 3, and converts most of the sodium bicarbonate into carbonate, thus raising the pH value of the decarbonated water for the prevention from corrosion of pipes 9 and 11 and tank 10 as well as of the deaerating heater, economizer, heat exchanger, pumps and other parts of the feed water system. Where there is no storage tank 10 it is sometimes preferable to introduce all of the returned alkaline boiler liquor through pipes 31 into the water space of heater 12 after all residual free $CO_2$, left in the decarbonated water, which is liberated in the heater, is expelled and passed out of the system through vent 14. In this case utilization of the return boiler liquor for neutralizing residual free $CO_2$ is obviated and only sufficient boiler liquor needs to be returned to leave the greater part or all of the sodium bicarbonate in the sulfated water converted to sodium carbonate. Where condensate water is utilized for boiler feed, introduction into the feed water of boiler liquor through both of the pipes 31 and 32 may be desirable because the condensate may have a low pH value due to presence of $CO_2$ and may thus lower the pH value of the water in the open heater after the condensate mixes with the decarbonated and deaerated make-up water. In such case, addition of sufficient boiler liquor in the heater tank 12 is desirable for the purpose of raising the pH value of the water in heater 12 to compensate for the low pH of the condensate.

In many cases it is not necessary to use a recirculating pump, such as 29. It is possible to use the boiler pressure to push the recirculating liquor through pipes 30, 31 and 32 directly into the feed water line. One arrangement for doing this is indicated as a valved by-pass 35 between the boiler liquor blow-off line 25 and the recirculating line 30, and another as a valved bypass 35a around the pump 29. Heat exchanger 21 should usually be made large enough to abstract the heat from the recirculating stream plus that in the blowoff waste stream. However, if there is an insufficiency of the exhaust steam available for raising the temperature of the feed water in heater 12 to the boiling point, then live steam must be used in heater 12 so that the water passing through the heater will be properly deaerated. If live steam is needed then it is advantageous to pass the hot recirculated boiler liquor directly from the boiler to heater 12, rather than to pass this boiler liquor through the heat exchanger. The hot boiler liquor has a temperature corresponding to the boiling point of water at the boiler pressure. Consequently, when this liquor is introduced into the heater, which usually operates at from zero to 25 pounds per square inch gage pressure, there is a considerable flashing of steam from the boiler liquor and this flash steam would take the place of some of the live steam required when there is an insufficiency of exhaust steam. In such a case pipe 25 would have two branches, one leading to heat exchanger 21 and the other leading directly to the water space of heater 12.

In a typical embodiment of the present invention the results shown in Table A were obtained. The table gives pH values and the analysis of the feed water at various stages of treatment. The boiler liquor was added to the feed water in the heating and deaerating tank 12 in the proportions of 1 to 20, i. e. 5 per cent of the feed water volume, and the feed water had the composition given in column 6 of the table. As shown in column 6, nearly all of the sodium bicarbonate in the deaerated, decarbonated, sulfated, softened water was converted to sodium carbonate and the pH of the treated water was increased from 8.6 to 9.8. Under these conditions, no evidence of corrosion could be found in the metal parts of the boiler accessory apparatus after more than a year of operation.

Table A
ANALYTICAL RESULTS IN PARTS PER MILLION

| | (1) Raw water | (2) After zeolite | (3) After acid feed | (4) After deaerator | (5) Boiler saline liquor | (6) Feed water after adding recirculated boiler liquor |
|---|---|---|---|---|---|---|
| Total hardness as $CaCO_3$ | 92.3 | 3.1 | 3.1 | 3.1 | 0 | 3.1 |
| $Ca(HCO_3)_2$ | 71.6 | 3.6 | 3.6 | 0 | 0 | 0 |
| $Mg(HCO_3)_2$ | 42.0 | 1.2 | 1.2 | 0 | 0 | 0 |
| $NaHCO_3$ | 0 | 117.5 | 45.0 | 40.4 | 0 | 1.9 |
| $CaCO_3$ | 0 | 0 | 0 | 2.2 | 0 | 2.2 |
| $MgCO_3$ | 0 | 0 | 0 | 0.7 | 0 | 0.7 |
| $Na_2CO_3$ | 0 | 0 | 0 | 2.0 | 184 | 53.0 |
| $NaOH$ | 0 | 0 | 0 | 0 | 157 | 0 |
| $CaSO_4$ | 26.4 | 0 | 0 | 0 | 0 | 0 |
| $MgSO_4$ | 0 | 0 | 0 | 0 | 0 | 0 |
| $Na_2SO_4$ | 0 | 27.6 | 87.1 | 87.1 | 1470 | 160 |
| Free $CO_2$ | 1.4 | 1.4 | 18.5 | 0 | 0 | 0 |
| pH value | 7.6 | 8.1 | 6.2 | 8.6 | 11.3 | 9.8 |

Many modifications are possible in the particular procedure given above for illustrative purposes. For example, it is possible, and in some cases desirable, to give the raw water its sulfating treatment prior to softening. In such cases the acid feed 4, 5, 6, and decarbonating tank 3 are put in ahead of the zeolite softeners 1, 1. This modification has the advantage of providing a factor of safety against temporary or accidental excesses of acid feed, the zeolite acting to neutralize excess acid, thus protecting the boiler plant at a small expense of decomposed zeolite. It is possible to apply my invention in connection with lime-soda softening as well as in plants using zeolite softening. When lime-soda softening is employed it is particularly advantageous to convert the required amount of carbonate and bicarbonate to sulfate by a sulfating treatment prior to the lime-soda treatment, taking care to coordinate the sulfating treatment with the lime-soda treatment in such a way as to leave the softened water with the desired sulfate-carbonate ratio. Then it is usually only necessary to return boiler liquor in amount sufficient to neutralize $CO_2$ introduced into the feed water system in condensate water. However, it may be desirable under some conditions to treat the lime-soda softened water with sulfating agents and then it will be found particularly desirable to adjust the pH value of the feed water by addition of boiler liquor in adjusted amounts.

What I claim is:

1. In supplying boilers with feed water composed of or containing naturally soft or artificially softened water containing sodium bicarbonate, the process of preventing corrosion in the boiler plant which comprises converting a part of such sodium bicarbonate into sulfate with development of free $CO_2$, aerating the water to partly remove free $CO_2$, heating the aerated water to remove air therefrom and adding to the so treated water concentrated liquor withdrawn from the boiler and passed through a heat exchanger so that most of the heat of the liquid is transferred to the feed water stream, this boiler liquor being added in such quantity that the feed water contains no free $CO_2$ and that sufficient sodium carbonate is present to raise the pH value to about 9 or above.

2. In supplying boilers with feed water composed of or containing naturally soft or artificially softened water containing sodium bicarbonate, the process of preventing corrosion in the boiler plant which comprises converting a part of such sodium bicarbonate into sulfate with the development of $CO_2$, aerating such water to partly remove the $CO_2$ and then passing the aerated water through a deaerating heater, mixing the so-treated water in the bottom of the deaerating heater with concentrated liquor withdrawn from the boiler, flashing a portion of this liquor into steam as the pressure is reduced from boiler pressure down to heater pressure and utilizing this flashed steam to complete the heating of the feed water to the boiling point corresponding to the heater pressure, this concentrated boiler liquor being added to the treated water in such proportion that the resulting mixture has a pH value of at least 9.

3. In the supply of boilers with feed water containing condensation water and naturally soft or artificially softened make-up water, said make-up water containing sodium bicarbonate, the process which comprises adding to the make-up water sulfuric acid in amount to convert part of the sodium bicarbonate into sodium sulfate, heating the treated water and adding thereto sufficient concentrated liquor from the boiler to neutralize free and bicarbonate $CO_2$ present, this addition of boiler liquor being prior to extensive contact of the treated water with metal parts.

4. The process of claim 3, wherein the conversion of sodium bicarbonate to sodium sulfate is effected by an addition of aluminum sulfate.

5. The process of claim 3, wherein the conversion of sodium bicarbonate to sodium sulfate is effected by an addition of iron sulfate.

6. In supplying feed water to boilers and boiler accessories, the process which comprises adding to feed water containing sodium as bicarbonate sulfuric acid ion to convert part of the sodium bicarbonate into sulfate, thereby liberating $CO_2$ and adding boiler liquor to the mixture in quantity sufficient to neutralize all the free $CO_2$ and to leave most of the bound $CO_2$ in the feed water combined as sodium carbonate.

7. In supplying feed water to boilers and boiler accessories, the process which comprises adding to feed water containing sodium as bicarbonate, sulfuric acid ion to convert part of the sodium into sulfate, and adding concentrated boiler liquor to the mixture in quantity sufficient to raise the pH value of the feed water above 9.

8. In continuous operation of steam boilers supplied with alkaline make-up water, a method of controlling corrosion in the boiler and its feed water accessories which comprises adding to the make-up water sufficient of a sulfating agent to convert part of the alkali to sulfate, continuously blowing off from the boiler concentrated boiler liquor and returning to the feed water such proportion of said liquor as is required to maintain in the feed water a pH value around 9 or above.

9. As an organization of apparatus elements in a feed water system for a steam boiler utilizing naturally soft or artificially softened water containing sodium bicarbonate, a combination of means for treating the feed water to prevent corrosion in the boiler plant which comprises a sulfating tank provided with means for delivering the soft water thereto, with means for feeding a sulfating agent into the soft water and with aerating means for removing $CO_2$, a deaerating heater adapted to receive sulfated water from the sulfating tank, a feed water line running through the deaerating heater to the boiler, a heat exchanger in the feed water line, means for withdrawing boiler liquor from the boiler through said heat exchanger, means for returning to the feed water line a portion of the withdrawn boiler liquor, means in the feed water line for observing the pH value of the feed water and means for adjusting the portion of boiler liquor return.

10. As an organization of apparatus elements in a feed water system for a steam boiler utilizing naturally soft or artificially softened water containing sodium bicarbonate, a combination of means for treating the feed water to prevent corrosion in the boiler plant which comprises a sulfating tank provided with means for delivering the soft water thereto, with means for feeding a sulfating agent into the soft water and with aerating means for removing $CO_2$, a deaerating heater adapted to receive sulfated water from the sulfating tank, a feed water line running through the deaerating heater to the boiler, means for withdrawing boiler liquor from the boiler, means for returning to the deaerating heater a portion of the withdrawn boiler liquor, means in the feed water line for observing the pH value of the feed water and means for adjusting the portion of boiler liquor return.

11. In a boiler feed water system supplying to a steam boiler feed of condensation water made up by naturally soft or artificially softened make-up water containing sodium bicarbonate, a combination of means for treating the feed water to limit its corrosive action comprising feeding and regulating means for adding to the make-up water a sulfating agent in amount converting part of the sodium bicarbonate into sodium sulfate, means for heating the treated make-up water and means for adding thereto sufficient concentrated liquor from the boiler to neutralize free and bicarbonate $CO_2$ present in the treated water and in the condensation water, said means being so arranged that the addition of said boiler liquor to said sulfated water is prior to extensive contact of the treated water with the metal parts of the feed water system.

12. As an organization of apparatus elements in a feed water system for a steam boiler utilizing naturally soft or artificially softened water containing sodium bicarbonate, a combination of means for treating the feed water to prevent corrosion in the boiler plant which comprises a sulfating tank provided with means for delivering the soft water thereto, with means for feeding a sulfating agent into the soft water and with aerating means for removing $CO_2$, a deaerating heater adapted to receive sulfated water from the sulfating tank, a feed water line running through the deaerating heater to the boiler, a heat exchanger in the feed water line, means for withdrawing boiler liquor from the boiler through said heat exchanger, means for returning to the feed water line ahead of the deaerating heater a portion of the withdrawn boiler liquor, means in the feed water line for observing the pH value of the feed water and means for adjusting the portion of boiler liquor return.

13. As an organization of apparatus elements in a feed water system for a steam boiler utilizing naturally soft or artificially softened water containing sodium bicarbonate, a combination of means for treating the feed water to prevent corrosion in the boiler plant which comprises a sulfating tank provided with means for delivering the soft water thereto, with means for feeding a sulfating agent into the soft water and with aerating means for removing $CO_2$, a deaerating heater adapted to receive sulfated water from the sulfating tank, a feed water line running through the deaerating heater to the boiler, a heat exchanger in the feed water line, means for withdrawing boiler liquor from the boiler through said heat exchanger, means for returning to the feed water line a portion of the withdrawn boiler liquor, means for returning to the deaerating heater another portion of the withdrawn boiler liquor, means in the feed water line for observing the pH value of the feed water and means for adjusting the respective portions of boiler liquor return.

14. As an organization of apparatus elements useful as a means for treating boiler feed water to prevent corrosion of the boiler and of its feed water accessories, a combination of a steam boiler, a blow off line for boiler liquor, a heat exchanger in said line, a feed water line running through said heat exchanger to the boiler, a heater in said feed water line ahead of the exchanger, means for delivering a portion of the blown off boiler liquor from the blow-off line beyond the heat exchanger to said feed water heater and of means for apportioning said boiler liquor delivery in relation to the pH value of the feed water.

15. As an organization of apparatus elements useful as a means for treating boiler feed water to limit its corrosive action, a combination with a steam boiler of a blow-off line for boiler liquor having a branch for running a portion of the blown off boiler liquor to waste and another branch for returning a portion of the boiler liquor to the feed water system, of a feed water line in heat exchanging relation to the blow-off line ahead of said branches, of means connecting said return branch of the blow-off line to the feed water line and of control means in both of said branches for adjusting the respective portions of the blow-off liquor to maintain in the feed water a pH value above 9.

In testimony whereof, I have hereunto affixed my signature.

SAMUEL B. APPLEBAUM.